(12) United States Patent
May

(10) Patent No.: US 11,066,590 B2
(45) Date of Patent: Jul. 20, 2021

(54) WATER-SOLUBLE POLYMER SHALE INHIBITORS

(71) Applicant: Halliburton Energy Services, Inc., Houston, TX (US)

(72) Inventor: Preston Andrew May, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 73 days.

(21) Appl. No.: 16/485,315

(22) PCT Filed: Sep. 17, 2018

(86) PCT No.: PCT/US2018/051282
§ 371 (c)(1),
(2) Date: Aug. 12, 2019

(87) PCT Pub. No.: WO2020/060525
PCT Pub. Date: Mar. 26, 2020

(65) Prior Publication Data
US 2020/0231859 A1   Jul. 23, 2020

(51) Int. Cl.
*C09K 8/10* (2006.01)

(52) U.S. Cl.
CPC ............ *C09K 8/10* (2013.01); *C09K 2208/12* (2013.01)

(58) Field of Classification Search
None
See application file for complete search history.

(56) References Cited

U.S. PATENT DOCUMENTS

| | | |
|---|---|---|
| 4,634,538 A | 1/1987 | Alexander |
| 5,195,847 A * | 3/1993 | Guymon .................. B09C 1/02 175/66 |
| 5,646,093 A * | 7/1997 | Dino ................... C08B 37/0087 507/110 |
| 2002/0139530 A1 | 10/2002 | Smith |
| 2013/0053283 A1 | 2/2013 | Maas |
| 2016/0122615 A1 | 5/2016 | Wagle et al. |
| 2016/0264836 A1* | 9/2016 | Wang ....................... C09K 8/20 |

FOREIGN PATENT DOCUMENTS

CN   1034511 C   4/1997

OTHER PUBLICATIONS

International Search Report and Written Opinion issued in related PCT Application No. PCT/US2018/051282 dated Jun. 13, 2019, 11 pages.
"OSPAR List of Substances Used and Discharged Offshore which Are Considered to Pose Little or No Risk to the Environment (PLONOR)—Update 2018", OSPAR Commission, 2018, 9 pages.

* cited by examiner

*Primary Examiner* — John J Figueroa
(74) *Attorney, Agent, or Firm* — Tenley Krueger; Baker Botts L.L.P.

(57) ABSTRACT

Shale inhibiting additives for subterranean drilling and/or treatment fluids that include water-soluble polymers are provided. In some embodiments, the methods include: providing a treatment fluid comprising an aqueous base fluid and a shale inhibiting additive comprising a water-soluble polymer; introducing the treatment fluid into at least a portion of a subterranean formation to contact at least a portion of the subterranean formation that comprises shale; and allowing the shale inhibiting additive to interact with the shale in the subterranean formation to at least partially inhibit the shale.

20 Claims, 3 Drawing Sheets

WATER-SOLUBLE POLYMER SHALE INHIBITORS

CROSS-REFERENCE TO RELATED APPLICATION

The present application is a U.S. National Stage Application of International Application No. PCT/US2018/051282 filed Sep. 17, 2018, which is incorporated herein by reference in its entirety for all purposes.

BACKGROUND

The present disclosure relates to systems and methods for drilling and/or treating subterranean formations that include shale.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. For example, a fluid may be used to drill a well bore in a subterranean formation or to complete a well bore in a subterranean formation, as well as numerous other purposes. A drilling fluid, or "mud" which a drilling fluid is also often called, is a treatment fluid that is circulated in a well bore as the well bore is being drilled to facilitate the drilling operation. The various functions of a drilling fluid include removing drill cuttings from the well bore, cooling and lubricating the drill bit, aiding in support of the drill pipe and drill bit, and providing a hydrostatic head to maintain the integrity of the well bore walls and prevent well blowouts.

During drilling of subterranean well bores, various strata that include reactive shales may be encountered. As used herein, the term "shale" is defined to mean materials that may "swell," or increase in volume, when exposed to water. Examples of these shales may include certain types of clays (for example, bentonite). Reactive shales may be problematic during drilling operations because of, inter alia, their tendency to degrade when exposed to aqueous media such as aqueous-based drilling fluids. This degradation, of which swelling is one example, can result in undesirable drilling conditions and undesirable interference with the drilling fluid. For instance, the degradation of the shale may interfere with attempts to maintain the integrity of drilled cuttings traveling up the well bore until such time as the cuttings can be removed by solids control equipment located at the surface.

Shale disintegration also may impact "equivalent circulating density" ("ECD"). ECD may be affected by the solids content of the drilling fluid, which may increase if surface solids control equipment cannot remove shale from the drilling fluid. Plastic viscosity (an indicator of size and quantity of solids) is an important parameter that affects drilling rate. Maintenance of appropriate ECD is important in drilling a well bore where a narrow tolerance exists between the weight of the drilling fluid needed to control the formation pressure and the weight of the drilling fluid that will fracture the formation. In such circumstances, minimizing shale degradation may be desirable, inter alia, to control of the viscosity of the drilling fluid. Moreover, degradation of drilled cuttings prior to their removal at the surface may prolong drilling time because shale particles traveling up the well bore can break up into smaller and smaller particles, which can expose new surface area of the shale particles to the drilling fluid and lead to further absorption of water and degradation.

Shale degradation may substantially decrease the stability of the well bore, which may cause irregularities in the diameter of the well bore, e.g., the diameter of some portions of the well bore may be either smaller or greater than desired. In an extreme case, shale degradation may decrease the stability of the well bore to such an extent that the well bore collapses. Degradation of the shale also may interrupt circulation of the drilling fluid, cause greater friction between the drill string and the well bore, and/or cause the drill string to become stuck in the well bore. Accordingly, the complications associated with shale swelling during drilling may substantially increase the time and cost of drilling.

One technique used to counteract the propensity of aqueous drilling fluids to interact with reactive shales in a formation involves the use of certain additives in aqueous drilling fluids that may inhibit shale, e.g., additives that may demonstrate a propensity for reducing the tendency of shale to absorb water. Amphoteric materials (i.e., substances that may exhibit both acidic and/or alkaline properties) are one type of water-based shale inhibitor that has been used in the past. Amphoteric materials are believed to attach to the shale substrate, thus preventing water ingress. However, amphoteric inhibitors may be environmentally undesirable, especially in heavily regulated areas, because they typically demonstrate low biodegradability and high toxicity. Potassium chloride is another conventional shale-inhibiting component. However, potassium chloride may only be moderately effective at inhibiting shale swelling in some cases and can be environmentally unacceptable in certain areas of the world since high concentrations of potassium ions may harm certain types of marine life or contaminate aquifers. Polyglycols have also been used as shale inhibitors in water-based drilling fluids but have not demonstrated satisfactory inhibition levels. Partially hydrolyzed polyacrylamides (PHPA) and polyvinylpyrrolidone (PVP) have also been utilized in many regions, but these have been found to have undesirable properties in certain circumstances.

BRIEF DESCRIPTION OF THE DRAWINGS

These drawings illustrate certain aspects of some of the embodiments of the present disclosure and should not be used to limit or define the claims.

Figure 1:
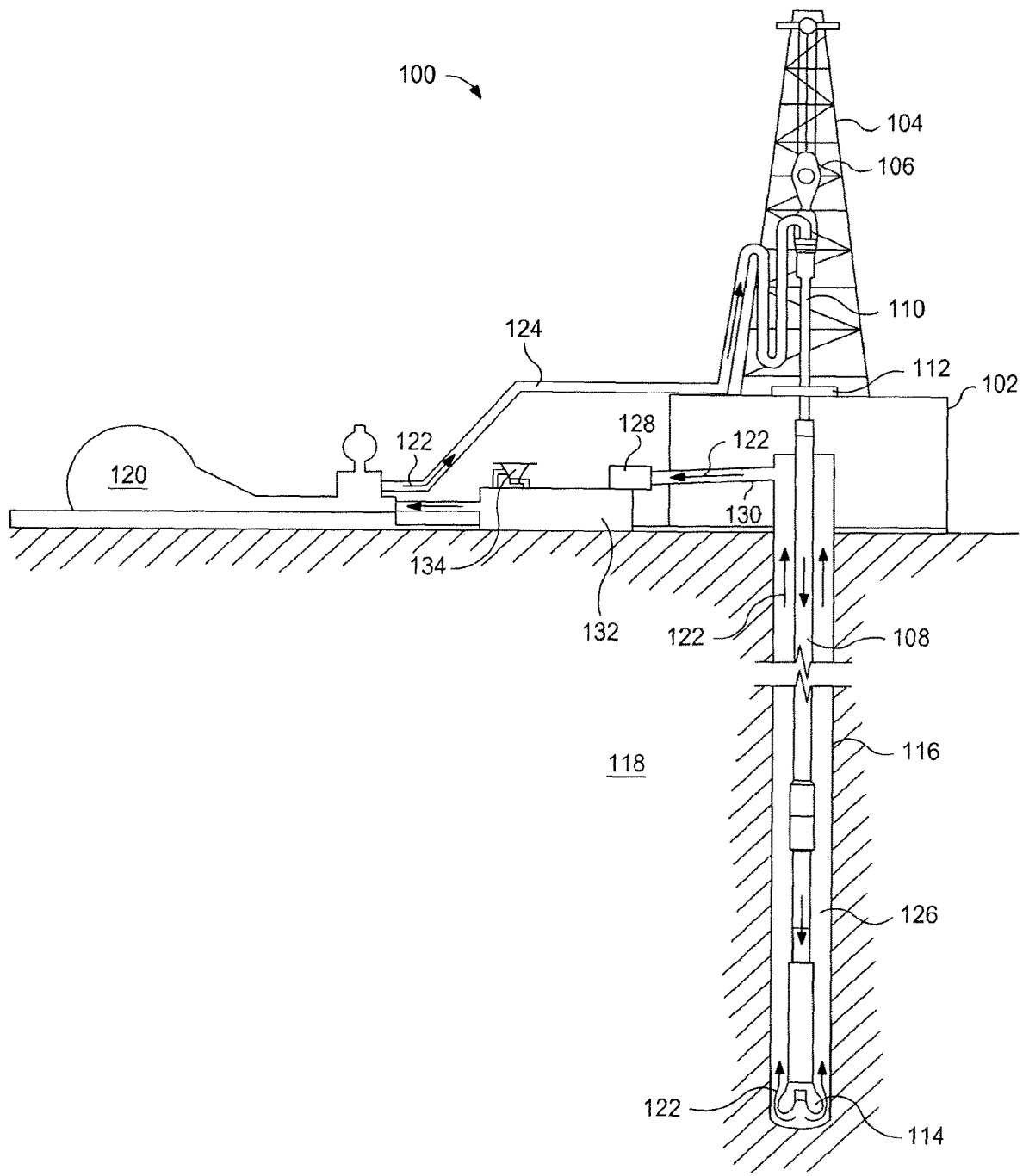
FIG. 1 is a diagram illustrating an example of a well bore drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for drilling and/or treating subterranean formations that include shale. More particularly, the present disclosure relates to shale inhibiting additives for subterranean drilling and/or treatment fluids that include water-soluble polymers that may have more desirable environmental properties.

The present disclosure provides shale inhibiting additives for use in drilling fluids and/or other subterranean treatment fluids, and methods of drilling well bores in subterranean formations using those additives and fluids. The treatment fluids of the present disclosure generally include an aqueous base fluid and a shale inhibiting additive including one or more water-soluble polymers. In certain embodiments, the shale inhibiting additive may consist of one or more water-soluble polymers. In certain embodiments, the one or more water-soluble polymers may be at least partially crosslinked with a crosslinking agent. The methods of the present disclosure generally include: providing a treatment fluid including an aqueous base fluid and a shale inhibiting additive including a water-soluble polymer; introducing the treatment fluid into at least a portion of a subterranean formation to contact at least a portion of the subterranean formation that includes shale; and allowing the shale inhibiting additive to interact with the shale in the subterranean formation to at least partially inhibit the shale.

Several different mechanisms may inhibit shale in subterranean formations, including but not limited to inhibition through charge interaction (e.g., using salts and amine-based additives), blocking of pores in the formation matrix using inert materials (e.g., using nanomaterials) to prevent aqueous fluids from contacting shales in the formation, and/or at least partially encapsulating shale particles in order to at least partially stabilize shale particles and/or prevent their attrition and/or abrasion into smaller particles. As referenced herein, the phrase "inhibit shale", or variants thereof, refers to the action of one or more of these different inhibition mechanisms, either individually or collectively. In some embodiments, the methods and compositions of the present disclosure may provide a shale inhibiting additive that acts as shale encapsulator. As used herein, the term "encapsulation" and variants thereof do not imply any particular degree of encapsulation or coating, whether partial or otherwise. In some embodiments, a shale encapsulator may form a porous barrier or other structure around the outer surface of a shale particulate that may aid in holding the shale particle together and/or reducing its attrition, abrasion, and/or degradation into smaller particles.

Among the many potential advantages to the methods and compositions of the present disclosure, only some of which are alluded to herein, the methods, compositions, and systems of the present disclosure may effectively inhibit shale as well as, or even better than, other shale inhibiting additives known in the art thereby at least partially eliminating the need for such other shale inhibiting additives. In some embodiments, the compositions of the present disclosure may exhibit increased biodegradability and/or fewer environmental problems as compared to certain shale inhibiting additives known in the art.

The treatment fluids (e.g., drilling fluids) used in the methods and systems of the present disclosure may include any aqueous base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In certain embodiments, the treatment fluids may include a mixture of one or more aqueous fluids with other fluids and/or gases, including but not limited to emulsions, foams, and the like.

The water-soluble polymers of the present disclosure may include any water-soluble polymers with acceptable biodegradation and/or aquatic toxicity levels. In certain embodiments, the water-soluble polymers of the present disclosure may include environmentally-friendly polymers that are on the "OSPAR List of Substances/Preparations Used and Discharged Offshore Which Are Considered to Pose Little or No Risk to the Environment" (hereinafter "PLONOR list") (available through the following website: https://www.ospar.org/work-areas/oic/chemicals) and/or pass one or more Organization of Economic Cooperation and Development (OECD) biodegradation tests (e.g., OECD 301C-F, 306, and 310). In certain embodiments, the water-soluble polymers of the present disclosure may be selected from the group consisting of cellulose derivatives (e.g., hydroxyethyl cellulose, carboxymethyl cellulose, carboxymethyl hydroxyethyl cellulose), guar, and guar derivatives (e.g., hydroxypropyl guar, carboxymethyl hydroxypropyl guar), and any combination thereof. In certain embodiments, the water-soluble polymers may be provided in liquid or dry form when added to the treatment fluid.

In certain embodiments, the water-soluble polymers of the present disclosure may be capable of imparting a viscosity of about 5.5 centipoise (cP) or greater to a 8.6 pounds per gallon (ppg) potassium chloride (KCl) brine at room temperature when 0.5 pounds per barrel (lb/bbl) of the water-soluble polymer is dissolved in the brine, as measured on a FANN® viscometer at 300 rpm. It is believed that the capability of a water-soluble polymer to impart the above-mentioned viscosity correlates with the molecular weight of the water-soluble polymer.

The shale inhibiting additives including a water-soluble polymer may be provided in a treatment fluid in any suitable amount. In certain embodiments, the shale inhibiting additive may consist of one or more water-soluble polymers. In some embodiments, the shale inhibiting additive may be included in the treatment fluid in an amount from about 0.1 lb/bbl to about 10 lb/bbl. In some embodiments, the shale inhibiting additives may be included in the treatment fluid in an amount from about 0.2 lb/bbl to about 5 lb/bbl. In some embodiments, the shale inhibiting additives may be included in the treatment fluid in an amount from about 0.5 lb/bbl to about 5 lb/bbl. In some embodiments, the shale inhibiting additives may be included in the treatment fluid in an amount from about 0.5 lb/bbl to about 1.5 lb/bbl. A person of skill in the art with the benefit of this disclosure will recognize suitable amounts of the shale inhibiting additive to include in a treatment fluid of the present disclosure based on, among other things, the amount and/or reactivity of shale in the formation, other components of the treatment fluid (e.g., brines), the desired viscosity of the treatment fluid, and other parameters of the operation in which the treatment fluid will be used. In certain embodiments, the treatment fluid does not include any polymer-based shale inhibiting additives and/or other shale inhibiting additives that are not environmentally-friendly (e.g., that are not included on the PLONOR list).

In addition to inhibiting shale, the water-soluble polymer in some embodiments also may increase the viscosity of the treatment fluid. In some embodiments, the water-soluble polymer may be at least partially soluble in acid. In such embodiments, the water-soluble polymer may be at least partially dissolved, removed, degraded, and the like after the water-soluble polymer has been used in a desired application in the subterranean formation in order to at least partially reduce or prevent formation damage.

In some embodiments, a portion of the water-soluble polymer may be crosslinked with a crosslinking agent. In other embodiments, the water-soluble polymer may not be crosslinked. As used herein, the term "crosslinking agent" includes any molecule, atom, or ion that is capable of forming one or more crosslinks between molecules of the crosslinkable polymer and/or between two or more atoms in a single molecule of the crosslinkable polymer. As used herein, the term "crosslink" as used herein refers to a covalent or ionic bond that links one polymer chain to another. The selection of a crosslinked water-soluble polymer or a water-soluble polymer that is not crosslinked for a particular application of the present disclosure may depend on, among other things, the desired viscosity of the treatment fluid, the molecular weight of the polymer, as well as other factors that will be recognized by a person of skill in the art with the benefit of this disclosure. When crosslinked, any crosslinking agent known in the art may be used. In some embodiments, suitable crosslinking agents may include, but is not limited to, an epihalohydrin.

When used, the crosslinking agent may be included in the treatment fluid in any suitable amount depending on, among other factors, the amount and/or molecular weight of the water-soluble polymers, the desired viscosity of the treatment fluid, and the like. In certain embodiments, the crosslinking agent may be included in the treatment fluid in amount that is about 0.01% to about 5% by weight of the water-soluble polymer in the treatment fluid. In some embodiments, the crosslinking agent may be included in the treatment fluid in amount that is about 0.01% to about 4% by weight of the water-soluble polymer in the treatment fluid. In some embodiments, the crosslinking agent may be included in the treatment fluid in amount that is about 0.01% to about 3% by weight of the water-soluble polymer in the treatment fluid. In some embodiments, the crosslinking agent may be included in the treatment fluid in amount that is about 0.01% to about 2% by weight of the water-soluble polymer in the treatment fluid. In some embodiments, the crosslinking agent may be included in the treatment fluid in an amount that is about 0.01% to about 1.5% by weight of the water-soluble polymer in the treatment fluid.

In some embodiments, the treatment fluids of the present disclosure may contain one or more salts, inter cilia, to provide the desired density to the treatment fluid. One of ordinary skill in the art, with the benefit of this disclosure, will recognize the need for caution when combining a salt with a treatment fluid for use in certain regions of the world where such use of a salt may be subject to environmental restrictions. One of ordinary skill in the art will also recognize where it is desirable to use a dense brine rather than, among other things, a solid weighting agent. Where the use of a salt is permissible, a variety of salts may be used. Examples of suitable salts include, but are not limited to, sodium chloride, potassium chloride, potassium formate, potassium carbonate, calcium chloride, calcium bromide, cesium formate, and zinc bromide. In certain embodiments, a mixture of suitable salts may be used. In certain embodiments, the salts may be present in the treatment fluids of the present disclosure in an amount from about 5 lb/bbl of the fluid to about the salt saturation limit of the treatment fluid.

In some embodiments, the treatment fluids used in the methods and systems of the present disclosure optionally may include any number of additional additives. Examples of such additional additives include, but are not limited to, surfactants, acids, proppant particulates, diverting agents, filtration agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional shale inhibitors, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application. In certain embodiments, the treatment fluids of the present disclosure do not include any shale inhibitors other the shale inhibiting additive including a water-soluble polymer.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the shale inhibiting additives and/or other components of the treatment fluid may be metered directly into a base treatment fluid to form a treatment fluid. In certain embodiments, the base fluid may be mixed with the shale inhibiting additives and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluid such as a drilling fluid of the present disclosure may be introduced into at least a portion of a well bore as it is drilled to penetrate at least a portion of a subterranean formation. The drilling fluid may be circulated in the well bore during drilling, among other reasons, to cool and/or lubricate a drill bit and/or drill pipe to prevent them from sticking to the walls of the well bore, prevent blowouts by serving as a hydrostatic head to counteract the sudden entrance into the well bore of high pressure formation fluids, suspend or remove formation cuttings from the well bore, and/or enhance the stability of the well bore during drilling.

The treatment fluids and shale inhibiting additives disclosed herein may directly or indirectly affect one or more components or pieces of equipment associated with the preparation, delivery, recapture, recycling, reuse, and/or disposal of the disclosed treatment fluids and shale inhibiting additives. For example, and with reference to FIG. 1, the disclosed treatment fluids and shale inhibiting additives may directly or indirectly affect one or more components or pieces of equipment associated with an exemplary well bore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the well bore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed shale inhibiting additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed shale inhibiting additives may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed shale inhibiting additives may be stored, reconditioned, and/or regulated until added to the drilling fluid 122.

As mentioned above, the disclosed shale inhibiting additives may directly or indirectly affect the components and equipment of the drilling assembly 100. For example, the disclosed shale inhibiting additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the shale inhibiting additives.

The disclosed shale inhibiting additives may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The disclosed treatment fluids and shale inhibiting additives may also directly or indirectly affect the mixing hopper 134 and the retention pit 132 and their assorted variations.

The disclosed treatment fluids and/or shale inhibiting additives may also directly or indirectly affect the various downhole equipment and tools that may come into contact with the treatment fluids and shale inhibiting additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed treat treatment fluids and/or shale inhibiting additives may also directly or indirectly affect any downhole heat exchangers, valves and corresponding actuation devices, tool seals, packers and other well bore isolation devices or components, and the like associated with the well bore 116. The disclosed treatment fluids and/or shale inhibiting additives may also directly or indirectly affect the drill bit 114, which may include, but is not limited to, roller cone bits, PDC bits, natural diamond bits, any hole openers, reamers, coring bits, etc.

While not specifically illustrated herein, the disclosed treatment fluids and/or shale inhibiting additives may also directly or indirectly affect any transport or delivery equipment used to convey the treatment fluids and/or shale inhibiting additives to the drilling assembly 100 such as, for example, any transport vessels, conduits, pipelines, trucks, tubulars, and/or pipes used to fluidically move the treatment fluids and/or shale inhibiting additives from one location to another, any pumps, compressors, or motors used to drive the treatment fluids and/or shale inhibiting additives into motion, any valves or related joints used to regulate the pressure or flow rate of the treatment fluids and/or shale inhibiting additives, and any sensors (i.e., pressure and temperature), gauges, and/or combinations thereof, and the like.

An embodiment of the present disclosure is a method that includes: providing a treatment fluid comprising an aqueous base fluid and a shale inhibiting additive comprising a water-soluble polymer; introducing the treatment fluid into at least a portion of a subterranean formation to contact at least a portion of the subterranean formation that comprises shale; and allowing the shale inhibiting additive to interact with the shale in the subterranean formation to at least partially inhibit the shale.

In one or more embodiments described in the preceding paragraph, the water-soluble polymer is selected from the group consisting of: a cellulose derivative, a guar, a guar derivative, and any combination thereof. In one or more embodiments described in the preceding paragraph, the water-soluble polymer is hydroxyethyl cellulose. In one or more embodiments described in the preceding paragraph, the water-soluble polymer is capable of imparting a viscosity of about 5.5 cP or greater to a 8.6 ppg potassium chloride brine at room temperature when 0.5 lb/bbl of the water-soluble polymer is dissolved in the brine, as measured on a FANN® viscometer at 300 rpm. In one or more embodiments described in the preceding paragraph, the treatment fluid does not include any shale inhibiting additives that are not listed on a PLONOR list. In one or more embodiments described in the preceding paragraph, the shale inhibiting additive is present in the treatment fluid an amount from about 0.1 lb/bbl to about 10 lb/bbl. In one or more embodiments described in the preceding paragraph, the aqueous base fluid comprises a brine. In one or more embodiments described in the preceding paragraph, the brine comprises a salt selected from the group consisting of: sodium chloride, potassium chloride, potassium formate, potassium carbonate, calcium chloride, calcium bromide, cesium formate, zinc bromide, and any combination thereof. In one or more embodiments described in the preceding paragraph, introducing the treatment fluid into at least a portion of a subterranean formation comprises circulating the treatment fluid in at least a portion of a well bore being drilled to penetrate the portion of the subterranean formation.

Another embodiment of the present disclosure is a method that includes: drilling at least a portion of a well bore to penetrate at least a portion of a subterranean formation that comprises shale; circulating a drilling fluid in at least a portion of the well bore while drilling at least a portion of the well bore, the drilling fluid comprising an aqueous base fluid and a shale inhibiting additive comprising a water-soluble polymer selected from the group consisting of a cellulose derivative, a guar, a guar derivative, and any combination thereof, wherein drilling fluid does not include any shale inhibiting additives that are not listed on a PLONOR list; and allowing the shale inhibiting additive to interact with the shale in the subterranean formation to at least partially inhibit the shale.

In one or more embodiments described in the preceding paragraph, the water-soluble polymer is selected from the group consisting of: a cellulose derivative, a guar, a guar derivative, and any combination thereof. In one or more embodiments described in the preceding paragraph, the water-soluble polymer is capable of imparting a viscosity of about 5.5 cP or greater to a 8.6 ppg potassium chloride (KCl) brine at room temperature when 0.5 lb/bbl of the water-soluble polymer is dissolved in the brine, as measured on a FANN® viscometer at 300 rpm. In one or more embodiments described in the preceding paragraph, the shale inhibiting additive is present in the drilling fluid an amount from about 0.1 lb/bbl to about 10 lb/bbl. In one or more embodiments described in the preceding paragraph, the aqueous base fluid comprises a brine. In one or more embodiments described in the preceding paragraph, the brine comprises a salt selected from the group consisting of: sodium chloride, potassium chloride, potassium formate, potassium carbonate, calcium chloride, calcium bromide, cesium formate, zinc bromide, and any combination thereof.

Another embodiment of the present disclosure is a method that includes: drilling at least a portion of a well bore to penetrate at least a portion of a subterranean formation that comprises shale; circulating a drilling fluid in at least a portion of the well bore while drilling at least a portion of the well bore, the drilling fluid comprising an aqueous base fluid that comprises a brine, and a shale inhibiting additive comprising a water-soluble polymer is capable of imparting a viscosity of about 5.5 cP or greater to a 8.6 ppg potassium chloride (KCl) brine at room temperature when 0.5 lb/bbl of the water-soluble polymer is dissolved in the brine, as measured on a FANN® viscometer at 300 rpm; and allowing the shale inhibiting additive to interact with the shale in the subterranean formation to at least partially inhibit the shale.

In one or more embodiments described in the preceding paragraph, the water-soluble polymer is selected from the group consisting of: a cellulose derivative, a guar, a guar derivative, and any combination thereof. In one or more embodiments described in the preceding paragraph, the shale inhibiting additive is present in the drilling fluid an amount from about 0.1 lb/bbl to about 10 lb/bbl. In one or more embodiments described in the preceding paragraph, the brine comprises a salt selected from the group consisting of: sodium chloride, potassium chloride, potassium formate, potassium carbonate, calcium chloride, calcium bromide, cesium formate, zinc bromide, and any combination thereof.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Example 1

Nine different formulations of fluid samples were prepared by dissolving various amounts of shale inhibiting additives of the present disclosure using different types of water-soluble polymers of the present disclosure in potassium chloride (KCl) brines having a weight of 8.6 pounds per gallon (ppg) as described in Table 1 below. A tenth fluid sample without any shale inhibiting additives and an eleventh fluid sample with an amide-containing water-soluble polymer that is not included on the PLONOR list were also prepared as described in Table 1 below. Significantly more of the amide-containing polymer was used as compared to the water-soluble polymers of the present disclosure because the amide-containing polymer is only about 10% active and about 90% water. Less brine was used in the eleventh fluid sample as compared to the other fluid samples for this same reason.

TABLE 1

| Sample | Polymer Type | Polymer (g) | Brine (mL) |
|---|---|---|---|
| 1 | none | — | 360.5 |
| 2 | hydroxyethyl cellulose 1 | 0.5 | 360.5 |
| 3 | hydroxyethyl cellulose 1 | 1.0 | 360.5 |
| 4 | hydroxyethyl cellulose 2 | 0.5 | 360.5 |
| 5 | hydroxyethyl cellulose 2 | 1.0 | 360.5 |
| 5 | hydroxyethyl cellulose 1 | 0.4 | 360.5 |
| 6 | guar | 0.1 | |
| 7 | guar | 0.5 | 360.5 |
| 8 | guar | 1.0 | 360.5 |
| 9 | hydroxypropyl guar | 0.5 | 360.5 |
| 10 | hydroxypropyl guar | 1.0 | 360.5 |
| 11 | amide-containing polymer | 10.5 | 350 |

Figure 2:
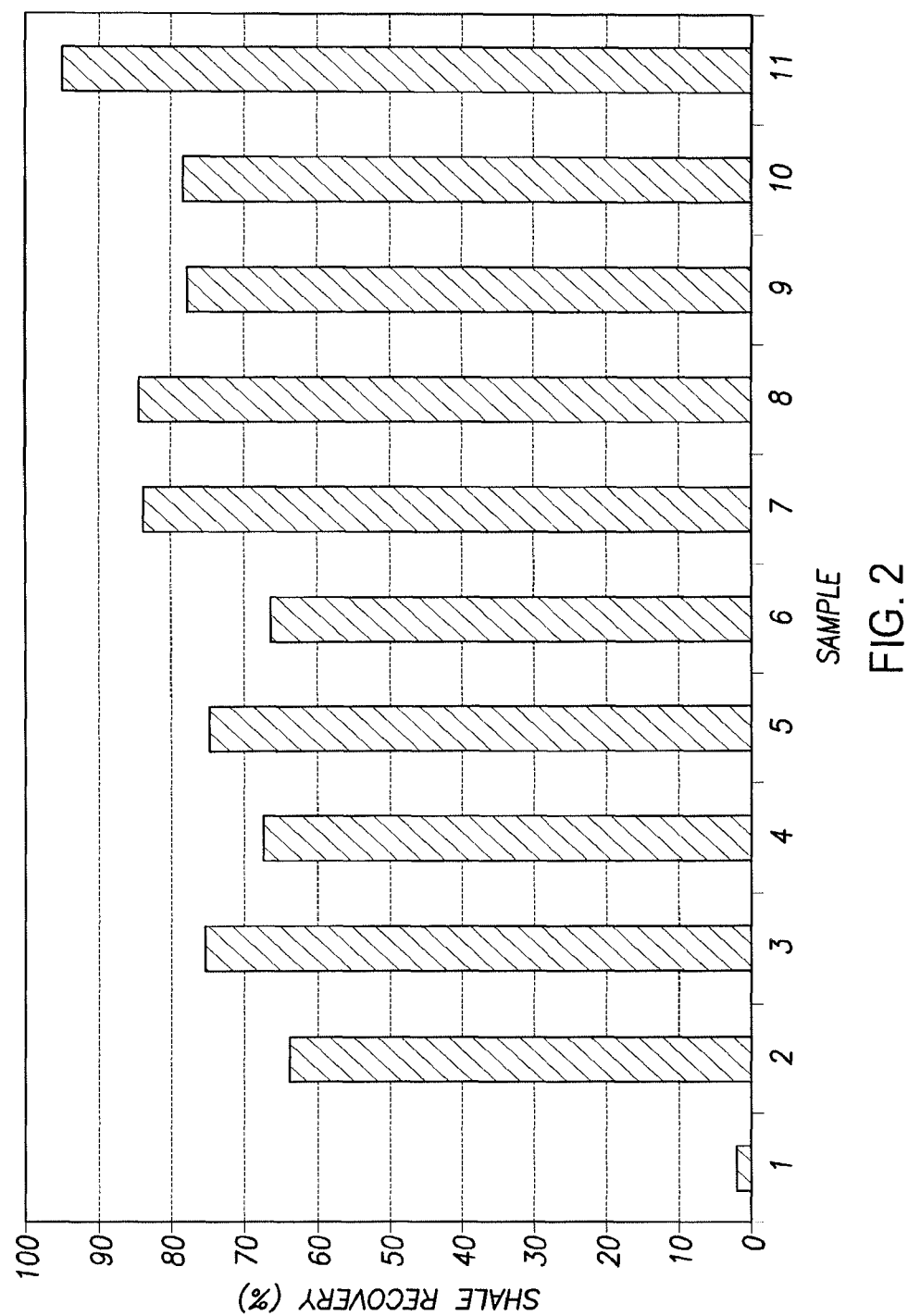
FIG. 2 is a graph illustrating data from shale erosion tests using various types of shale inhibiting additives, including certain shale inhibitors of the present disclosure.

Twenty (20) grams of London Clay shale particulates having a size from about 2 mm to about 4 mm were placed into nine jars to which 350 mL of a different sample was added to each jar. Each of the samples was then used to perform a shale erosion test according to American Petroleum Institute (API) Recommended Practice 13I: Shale-particle disintegration test by hot rolling. The samples were all hot rolled at 150° F. for 16 hours and then poured over a 10-mesh (2 mm) sieve to determine the percentage of the London Clay shale particulates that retained their original size. The results of those tests are shown in Table 2 below and in FIG. 2.

TABLE 2

| Sample | Polymer Type | Polymer (lb/bbl) | % Shale Retained |
|---|---|---|---|
| 1 | none | — | 2 |
| 2 | hydroxyethyl cellulose 1 | 0.5 | 64 |
| 3 | hydroxyethyl cellulose 1 | 1.0 | 75.3 |
| 4 | hydroxyethyl cellulose 2 | 0.5 | 67.4 |
| 5 | hydroxyethyl cellulose 2 | 1.0 | 74.9 |
| 6 | hydroxyethyl cellulose 1 | 0.4 | 66.4 |
| | guar | 0.1 | |
| 7 | guar | 0.5 | 83.9 |
| 8 | guar | 1.0 | 84.6 |
| 9 | hydroxypropyl guar | 0.5 | 78 |
| 10 | hydroxypropyl guar | 1.0 | 78.4 |
| 11 | non-PLONOR inhibitor | 10.5 | 95 |

As shown, all fluids achieved good shale retention at 0.5 and 1.0 lb/bbl of the water-soluble polymer, with Samples 3, 5, 7, 8, 9, and 10 each imparting greater than 70% shale retention. Thus, Example 1 demonstrates that the water-soluble polymers of the present disclosure can perform effectively as shale inhibitors and further perform comparably to certain other shale inhibitor additives.

Example 2

Next, two embodiments of treatment fluids of the present disclosure, Sample A and Sample B, were prepared using the water-soluble polymer from Sample 2 and Sample 4 from Example 1, respectively, as well as certain other known additives that may be included in a subterranean drilling fluid, as shown in Table 3 below. As also shown in Table 3 below, two control samples, Control 1 and Control 2, were prepared with the same other additives as in Samples A and B, but without any shale inhibiting additive in Control 1 and with an amide-containing water-soluble polymer that is not included on the PLONOR list in Control 2. Each treatment fluid was used to perform a shale erosion test, according to an API standard test for shale retention, that included hot rolling the samples at 194° F. for 16 hours. The results of the shale erosion tests are shown in Table 4 below.

TABLE 3

| Component | Control 1 No Inhibitor | Control 2 Non-PLONOR Inhibitor | Sample A PLONOR Inhibitor | Sample B PLONOR Inhibitor |
|---|---|---|---|---|
| 8.6 ppg KCl brine, bbl | 319.55 | 309.53 | 319.55 | 319.55 |
| Fluid Loss Additive A, lb | 7 | 7 | 7 | 7 |
| Viscosifier, lb | 1.1 | 1.1 | 1.1 | 1.1 |
| Fluid Loss Additive B, lb | 2.1 | 2.1 | 2.1 | 2.1 |
| Hydroxyethyl Cellulose 1 (PLONOR), lb | — | — | 0.5 | — |
| Hydroxyethyl Cellulose 2 (PLONOR), lb | — | — | — | 0.5 |
| Amide-containing polymer (NON-PLONOR), lb | — | 10.5 | — | — |
| Alkalinity Agent, lb | 0.5 | 0.5 | 0.5 | 0.5 |
| Anti-accretion Additive, lb | 10.5 | 10.5 | 10.5 | 10.5 |
| Weighting Agent, lb | 97.37 | 97.37 | 97.37 | 97.37 |

TABLE 4

| Results | Control 1 | Control 2 | Sample A | Sample B |
|---|---|---|---|---|
| 600 rpm | 70 | 66 | 79 | 77 |
| 300 rpm | 42 | 44 | 59 | 54 |
| 200 rpm | 32 | 30 | 48 | 43 |
| 100 rpm | 20 | 19 | 34 | 31 |
| 6 rpm | 4 | 4 | 10 | 10 |
| 3 rpm | 3 | 3 | 8 | 7 |
| 10 sec gel | 5 | 4 | 9 | 9 |
| 10 min gel | 4 | 3 | 11 | 11 |
| 30 min gel | 5 | 4 | 12 | 12 |
| Shale Recovery, % | 83 | 95 | 98.9 | 101.2 |

Shale recovery is calculated based on the weight of the recovered shale compared to that of the shale originally used. As shown, Samples A and B achieved 98.9% and 101.2% shale recovery, respectively, as compared to 83% of Control 1 without any shale inhibiting additive and 95% with the non-PLONOR shale inhibiting additive. Notably, the shale recovery for Samples A and B were greater than Samples 1 and 3 from Example 1, respectively, having the same water-soluble polymer because other additives in the treatment fluids increases shale recovery, as demonstrated by comparing the shale recovery of Sample 10 in Example 1 and Control 1 in Example 2. Additionally, the shale recovery for Sample B exceeded 100% likely because various components in the treatment fluid may have adsorbed onto the shale thus making it heavier than the amount of shale originally used. Thus, Example 2 demonstrates that water-soluble polymers of the present disclosure can perform effectively as shale inhibitors and further perform comparably to certain other shale inhibitor additives.

Example 3

Various amounts of nine different shale inhibiting additives including water-soluble polymers of the present disclosure, as described in Table 5 below, were dissolved in 360.5 mL of potassium chloride (KCl) brine having a weight of 8.6 pounds per gallon (ppg) for about 20 minutes. The water-soluble polymers include nine different hydroxyethyl celluloses ("HEC") that are commercially available from SE Tylose GmbH & Co. KG. Before shale erosion testing was performed, the viscosity of each fluid was measured at room temperature on a FANN® viscometer at 300 rpm. Twenty (20) grams of London Clay shale particulates having a size from about 2 mm to about 4 mm were placed into nine jars to which 350 mL of a different sample was added to each jar. Each of the samples was then used to perform a shale erosion test according to American Petroleum Institute (API) Recommended Practice 13I: Shale-particle disintegration test by hot rolling. The samples were all hot rolled at 150° F. for 16 hours and then poured over a 10-mesh (2 mm) sieve to determine the percentage of the London Clay shale particulates that retained their original size. The results of those tests are shown in Table 5 below and in FIG. 3.

TABLE 5

| Sample | Polymer (ppg) | Viscosity (cP) | Shale Recovery (%) |
| --- | --- | --- | --- |
| HEC A | 0.5 | 2 | 2.5 |
|  | 1.0 | 4 | 4.4 |
|  | 2.0 | 13 | 22 |
| HEC B | 0.5 | 3.5 | 27.8 |
|  | 1.0 | 8.5 | 51.6 |
|  | 2.0 | 31 | 53.3 |
| HEC C | 0.5 | 4.5 | 41.9 |
|  | 1.0 | 12 | 61.8 |
|  | 2.0 | 48 | 65.1 |
| HEC D | 0.5 | 5.5 | 55.5 |
|  | 1.0 | 15 | 66.5 |
|  | 2.0 | 57 | 69.9 |
| HEC E | 0.5 | 6 | 57.7 |
|  | 1.0 | 17 | 71 |
|  | 2.0 | 64.5 | 77.5 |
| HEC F | 0.5 | 6 | 68.7 |
|  | 1.0 | 19 | 74.7 |
|  | 2.0 | 69 | 82.1 |
| HEC G | 0.5 | 6 | 67.5 |
|  | 1.0 | 17 | 75.6 |
|  | 2.0 | 62 | 79.7 |
| HEC H | 0.5 | 6 | 69 |
|  | 1.0 | 19.5 | 77.1 |
|  | 2.0 | 69 | 84.2 |
| HEC I | 0.5 | 6.5 | 70.1 |
|  | 1.0 | 19 | 76.5 |
|  | 2.0 | 68 | 86.9 |

Figure 3:
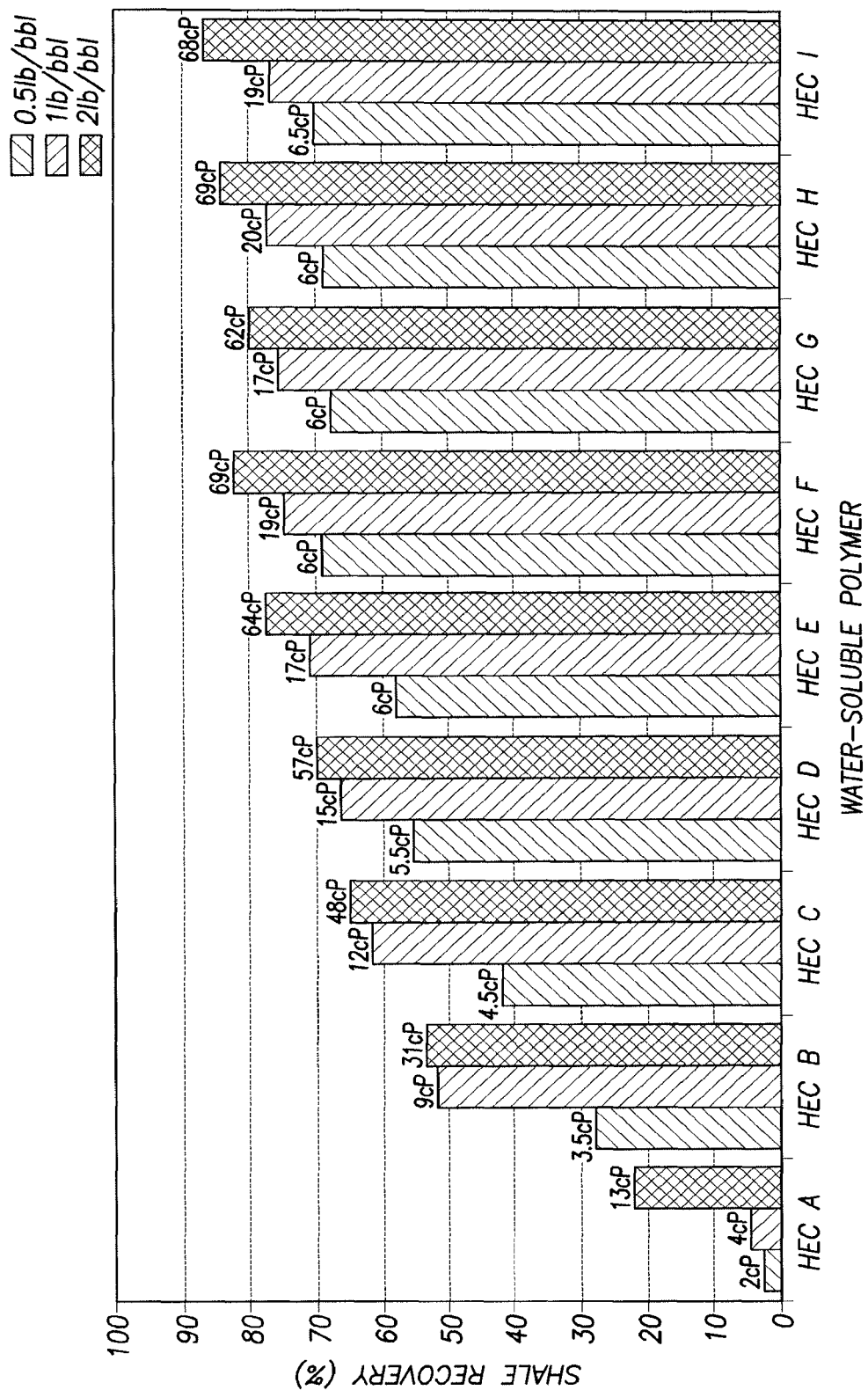
FIG. 3 is graph illustrating data from shale erosion tests using various types of shale inhibiting additives, including certain shale inhibitors of the present disclosure.

As shown in Table 5 and FIG. 3, the water-soluble polymers that resulted in a fluid having a viscosity of about 5.5 cP or greater also achieved greater than 50% shale recovery. It is believed that the ability of the water-soluble polymers to impart a viscosity of about 5.5 cP or greater to a 8.6 ppg potassium chloride (KCl) brine at room temperature when 0.5 lb/bbl of the water-soluble polymer is dissolved in the brine, as measured on a FANN® viscometer at 300 rpm, correlates with the molecular weight of the water-soluble polymer. Thus, Example 3 demonstrates that certain water-soluble polymers may perform better as shale inhibiting additives than others.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid comprising an aqueous base fluid and a shale inhibiting additive comprising a water-soluble polymer, wherein the treatment fluid does not include any shale inhibiting additives that are not listed on a PLONOR list;
introducing the treatment fluid into at least a portion of a subterranean formation to contact at least a portion of the subterranean formation that comprises shale; and
allowing the shale inhibiting additive to interact with the shale in the subterranean formation to at least partially inhibit the shale.

2. The method of claim 1 wherein the water-soluble polymer is selected from the group consisting of: a cellulose derivative, a guar, a guar derivative, and any combination thereof.

3. The method of claim 2 wherein the water-soluble polymer is hydroxyethyl cellulose.

4. The method of claim 1 wherein 0.5 lb/bbl of the water-soluble polymer when dissolved in an 8.6 ppg potassium chloride (KCl) brine at room temperature imparts a viscosity to the brine of about 5.5 cP or greater, as measured on a FANN® viscometer at 300 rpm.

5. The method of claim 1 wherein the shale inhibiting additive is present in the treatment fluid an amount from about 0.1 lb/bbl to about 10 lb/bbl.

6. The method of claim 1 wherein the aqueous base fluid comprises a brine.

7. The method of claim 6 wherein the brine comprises a salt selected from the group consisting of: sodium chloride, potassium chloride, potassium formate, potassium carbonate, calcium chloride, calcium bromide, cesium formate, zinc bromide, and any combination thereof.

8. The method of claim 1 wherein introducing the treatment fluid into at least a portion of a subterranean formation comprises circulating the treatment fluid in at least a portion of a well bore being drilled to penetrate the portion of the subterranean formation.

9. A method comprising:
drilling at least a portion of a well bore to penetrate at least a portion of a subterranean formation that comprises shale;
circulating a drilling fluid in at least a portion of the well bore while drilling at least a portion of the well bore, the drilling fluid comprising an aqueous base fluid and a shale inhibiting additive comprising a water-soluble polymer selected from the group consisting of a cellulose derivative, a guar, a guar derivative, and any combination thereof, wherein drilling fluid does not include any shale inhibiting additives that are not listed on a PLONOR list; and
allowing the shale inhibiting additive to interact with the shale in the subterranean formation to at least partially inhibit the shale.

10. The method of claim 9 wherein the water-soluble polymer is selected from the group consisting of a cellulose derivative, a guar, a guar derivative, and any combination thereof.

11. The method of claim 9 wherein 0.5 lb/bbl of the water-soluble polymer when dissolved in an 8.6 ppg potassium chloride (KCl) brine at room temperature imparts a viscosity to the brine of about 5.5 cP or greater, as measured on a FANN® viscometer at 300 rpm.

12. The method of claim 9 wherein the shale inhibiting additive is present in the drilling fluid an amount from about 0.1 lb/bbl to about 10 lb/bbl.

13. The method of claim 9 wherein the aqueous base fluid comprises a brine.

14. The method of claim 13 wherein the brine comprises a salt selected from the group consisting of: sodium chloride, potassium chloride, potassium formate, potassium carbonate, calcium chloride, calcium bromide, cesium formate, zinc bromide, and any combination thereof.

15. A method comprising:
drilling at least a portion of a well bore to penetrate at least a portion of a subterranean formation that comprises shale;
circulating a drilling fluid in at least a portion of the well bore while drilling at least a portion of the well bore, the drilling fluid comprising
an aqueous base fluid that comprises a brine, and
a shale inhibiting additive comprising a water-soluble polymer, wherein 0.5 lb/bbl of the water-soluble polymer when dissolved in an 8.6 ppg potassium chloride (KCl) brine at room temperature imparts a viscosity to the brine of about 5.5 cP or greater, as measured on a FANN® viscometer at 300 rpm; and
allowing the shale inhibiting additive to interact with the shale in the subterranean formation to at least partially inhibit the shale.

16. The method of claim 15 wherein the water-soluble polymer is selected from the group consisting of: a cellulose derivative, a guar, a guar derivative, and any combination thereof.

17. The method of claim 16 wherein the water-soluble polymer is hydroxyethyl cellulose.

18. The method of claim 15 wherein the shale inhibiting additive is present in the drilling fluid an amount from about 0.1 lb/bbl to about 10 lb/bbl.

19. The method of claim 15 wherein the brine comprises a salt selected from the group consisting of: sodium chloride, potassium chloride, potassium formate, potassium carbonate, calcium chloride, calcium bromide, cesium formate, zinc bromide, and any combination thereof.

20. The method of claim 15 wherein the drilling fluid does not include any shale inhibiting additives that are not listed on a PLONOR list.

\* \* \* \* \*